United States Patent
Min

(10) Patent No.: US 10,810,968 B2
(45) Date of Patent: Oct. 20, 2020

(54) ELECTRONIC DEVICE AND ELECTRONIC DEVICE CONTROL METHOD

(71) Applicant: SAMSUNG ELECTRONICS CO., LTD., Suwon-si (KR)

(72) Inventor: Kyoung Bo Min, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/347,310

(22) PCT Filed: Sep. 4, 2017

(86) PCT No.: PCT/KR2017/009666
§ 371 (c)(1),
(2) Date: May 3, 2019

(87) PCT Pub. No.: WO2018/084414
PCT Pub. Date: May 11, 2018

(65) Prior Publication Data
US 2019/0333473 A1 Oct. 31, 2019

(30) Foreign Application Priority Data
Nov. 3, 2016 (KR) .................... 10-2016-0145495

(51) Int. Cl.
*G09G 5/10* (2006.01)
*G06F 3/16* (2006.01)
(Continued)

(52) U.S. Cl.
CPC .............. *G09G 5/10* (2013.01); *G06F 3/165* (2013.01); *G09G 5/003* (2013.01); *H04R 1/023* (2013.01)

(58) Field of Classification Search
CPC .. H04R 1/023; H04R 2499/11; H04R 29/001; H04R 3/04; H04R 1/02; H04R 2430/01;
(Continued)

(56) References Cited

U.S. PATENT DOCUMENTS

| 6,546,101 B1 | 4/2003 | Murray et al. |
| 6,947,555 B2 | 9/2005 | Murray et al. |

(Continued)

FOREIGN PATENT DOCUMENTS

| JP | 2006-94029 A | 4/2006 |
| JP | 2008-85658 A | 4/2008 |

(Continued)

OTHER PUBLICATIONS

Search Report dated Dec. 14, 2017, issued by the International Searching Authority in International Application No. PCT/KR2017/009666 (PCT/ISA/210).

(Continued)

*Primary Examiner* — Xiao M Wu
*Assistant Examiner* — Scott E Sonners
(74) *Attorney, Agent, or Firm* — Sughrue Mion, PLLC

(57) ABSTRACT

An electronic device according to an embodiment includes a housing including at least one of a display that displays an image and a speaker that outputs sound, a mounting detection unit that is disposed on a first surface of the housing to determine whether a grill is mounted, and a processor that compensates at least one of an output image of the display and an output sound source of the speaker depending on whether the grill is mounted, which is detected by the mounting detection unit.

15 Claims, 12 Drawing Sheets

(51) Int. Cl.
*G09G 5/00* (2006.01)
*H04R 1/02* (2006.01)

(58) Field of Classification Search
CPC ....... H04R 2201/02; G06F 3/165; G06F 3/16; H04M 1/72575; H04M 1/0283; H04M 1/22; G06T 7/70; G06T 7/90
See application file for complete search history.

(56) References Cited

U.S. PATENT DOCUMENTS

| | | | |
|---|---|---|---|
| 7,072,468 | B2 | 7/2006 | Murray et al. |
| 9,521,497 | B2 | 12/2016 | Schuster et al. |
| 9,854,374 | B2 | 12/2017 | Schuster et al. |
| 2003/0072440 | A1 | 4/2003 | Murray et al. |
| 2003/0087664 | A1 | 5/2003 | Murray et al. |
| 2011/0216930 | A1 | 9/2011 | Kobayashi |
| 2011/0235840 | A1 | 9/2011 | Mels et al. |
| 2012/0250875 | A1 | 10/2012 | Nicholson et al. |
| 2012/0250924 | A1 | 10/2012 | Nicholson et al. |
| 2013/0170684 | A1* | 7/2013 | Nicholson ............. H03G 3/348 381/334 |
| 2013/0177196 | A1 | 7/2013 | Lee |
| 2016/0057555 | A1* | 2/2016 | Schuster ............... G06F 3/0346 381/59 |
| 2017/0055092 | A1 | 2/2017 | Schuster et al. |
| 2018/0098166 | A1 | 4/2018 | Schuster et al. |

FOREIGN PATENT DOCUMENTS

| | | |
|---|---|---|
| JP | 2011-188220 A | 9/2011 |
| JP | 2012-511839 A | 5/2012 |
| WO | 2015/134278 A1 | 9/2015 |

OTHER PUBLICATIONS

Written Opinion dated Dec. 14, 2017, issued by the International Searching Authority in International Application No. PCT/KR2017/009666 (PCT/ISA/237).

* cited by examiner

ELECTRONIC DEVICE AND ELECTRONIC DEVICE CONTROL METHOD

TECHNICAL FIELD

The present disclosure relates to an electronic device and a control method thereof.

BACKGROUND ART

A speaker may be covered with a grill formed of a thin cloth or a wire mesh for protection and beautification of the speaker.

The grill covering the speaker may reflect, absorb and cancel sound waves in medium and high frequency bands output from the speaker and may cause diffraction of sound waves in low frequency bands. As described above, the output of the speaker covered by the grill may vary in the sound quality due to sound source impedance depending on the material and lattice transmittance (aperture ratio) of the grill.

DISCLOSURE

Technical Problem

According to embodiments disclosed in the disclosure, a speaker-combined electronic device may be covered by a grill at an output part of a display, leading to a change in an output image.

According to embodiments disclosed in the disclosure, there are provided an electronic device including a speaker and a display capable of being used in a state of being covered with a grill, and a control method thereof.

Technical Solution

An electronic device according to an aspect of the disclosure includes a housing including at least one of a display that displays an image and a speaker that outputs sound, a mounting detection unit that is disposed on a first surface of the housing to determine whether a grill is mounted, and a processor that compensates at least one of an output image of the display and an output sound source of the speaker depending on whether the grill is mounted, which is detected by the mounting detection unit.

A control method of an electronic device according to an aspect of the disclosure includes identifying whether a grill is mounted on a first surface of a housing including at least one of a display that outputs an image and a speaker that outputs sound and compensating at least one of an output image of the display and an output sound source of the speaker according to whether the grill is mounted.

Advantageous Effects

According to the embodiments disclosed in the disclosure, it is possible to compensate a sound quality and an image quality to be changed due to a grill.

MODE FOR INVENTION

Figure 1A:
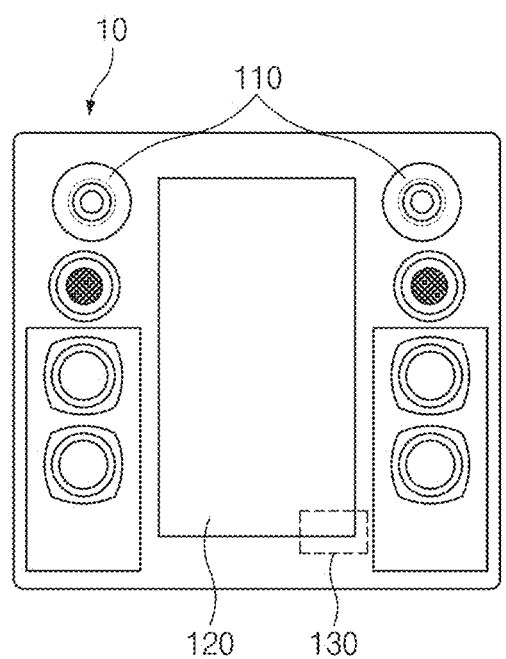
FIG. 1A is a diagram of an electronic device in which a grill is not mounted, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the various embodiments may be used to refer to various components regardless of the order and/or the priority, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Figure 1B:
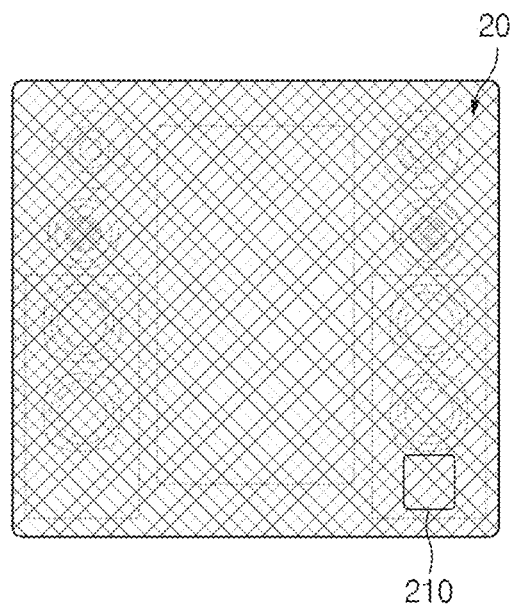
FIG. 1B is a diagram of an electronic device in which a grill is mounted according to one embodiment.

FIG. 1A is a diagram of an electronic device in which no grill is mounted, according to an embodiment, and FIG. 1B is a diagram of an electronic device in which a grill is mounted according to one embodiment.

As illustrated in FIG. 1A, an electronic device 10 according to an embodiment may not be coupled to a grill 20. As illustrated in FIG. 1B, the grill 20 may be coupled.

According to an embodiment, the grill 20 may be mounted on or detached from the electronic device 10. According to an embodiment, the grill 20 may be mounted on a front surface of the electronic device 10 in a similar method to a method of pulling down a blind from the top. The grill 20 may be mounted on the electronic device 10 in a sliding method (e.g., top→bottom, left→right). However, the method in which the grill 20 is mounted on the electronic device 10 may not be limited to the above-described method. For example, the grill 20 may be mounted on the electronic device 10 in various methods, such as a method of being removably mounted on a front surface of the electronic device 10. In addition, the grill 20 may be mounted on the front surface of the housing, but may be also fastened to a rear surface, a side surface, or an upper surface instead of the front surface because the grill 20 is provided to wrap the front surface of the housing.

According to an embodiment, the grill 20 may be configured to cover or wrap at least a portion of an output part of the at least one display 120 and a plurality of speakers 110 provided in the electronic device 10. The grill 20 may wrap the output part of the at least one display 120 and the plurality of speakers 110 when mounted on the electronic device 10. For example, the grill 20 may have a rectangular shape, and may have a hexahedron shape whose one face is open, the hexahedron shape including a first face concatenated to the output part of the display 120 and the speakers 110, and four faces (upper, lower, left, and right faces) extending in a direction perpendicular to the first face or a direction crossing the first face.

According to an embodiment, the grill 20 mounted on the electronic device 10 may cause a change in an output sound source of the speaker 110 and may cause at least one of a change in screen brightness, color distortion or moire of the display 120. The moire phenomenon is a phenomenon in which two waves having similar frequencies affect each other and a frequency width varies in a certain period according to a difference between the two frequencies, and may be an interference pattern occurring between objects having a certain interval. The moire phenomenon may be a phenomenon in which a rainbow-colored wave pattern is viewed on a mosquito net or striped clothes. The moire phenomenon may be improved by eliminating a high frequency component of an image through a low pass filter (LPF). However, elimination of high frequency components may degrade image clarity and resolution.

According to an embodiment, the grill 20 may include a sensing object 210 in at least some areas. The sensing object 210 may be used to determine whether a grill is mounted on the electronic device 10. For example, the sensing object 210, which is a member provided in a part of the grill 20, may be at least one of a magnetic material, a memory (e.g., a tag), a coupling member, or a metal member. According to an embodiment, the memory of the grill 20 may store grill identification information (e.g., ID) assigned to distinguish grills from each other and may be in the form of a small memory chip such as a USIM card, SD card, micro SD card.

According to an embodiment, the grill 20 may be constructed from a variety of materials. For example, the grill 20 may be formed of at least one material of cloth (e.g., jersey), metal, or plastic. According to an embodiment, the grill 20 may be formed of a plurality of materials. For example, the grill 20 is formed in a hexahedron shape with one face opened. A first face of the plurality of faces concatenated to an output part of the display 120 and the speaker 110 is made of cloth material, and a portion coupled with the electronic device 10, which is at least a part of four faces (upper, lower, left, and right faces) other than the first face, may be made of a rigid material (e.g., metal, plastic, etc.).

According to an embodiment, the electronic device 10 may include at least one speaker 110, at least one display 120, and a processor 130 in a single housing.

According to an embodiment, the grill 20 may be coupled to at least one surface of the housing. The grill 20 may be coupled to the electronic device 10 in a shape that wraps at least one surface of the housing. At least one surface of the housing may include a surface on which an output part of the at least one speaker 110 is disposed. The grill 20 may be mounted on the electronic device 10 in a shape that covers at least a portion of an output part of the at least one display 120.

According to an embodiment, the at least one speaker 110 or the at least one display 120 may be disposed such that an output part thereof is directed towards the first surface of the electronic device 10. The first surface may be the front surface of the electronic device 10. Alternatively, the at least one speaker 110 or the at least one display 120 may be provided on a plurality of surfaces of the electronic device 10.

According to an embodiment, the at least one speaker 110 may output sound. The at least one speaker 110 is provided such that the output part thereof is disposed on the first surface of the electronic device 10 or a plurality of surfaces (e.g., front and side surfaces) including the first surface to output sound. As illustrated in FIG. 1A, the electronic device 10 may be provided with eight speakers that output sound to the first surface. The at least one speaker 110 may be a multi-channel speaker including a stereo speaker.

According to an embodiment, the display 120 may output an image to a first surface (e.g., a front surface) of the electronic device 10. As illustrated in FIG. 1A, the display 120 may output an image to the first surface of the electronic device 10.

The display 120 may output an output image corresponding to a sound source to be output. For example, the output image may be at least one of an image representing whether a sound source is reproduced, sound source information (e.g., the title of a sound source being reproduced), or a moving image (e.g., music video of a sound source). According to an embodiment, the display 120 may include various devices such as an LCD, an OLED, a PDP, and an LED.

According to an embodiment, the processor 130 may generally control operation of the speaker 110 and the display 120. According to an embodiment, when the grill 20 is mounted, the processor 130 may compensate at least one of a sound source or an image, which is affected by mounting of the grill, using a predetermined compensation value or a compensation value set using the predetermined compensation value. For example, the processor 130 may amplify sound of a frequency band to be attenuated by the grill 20 in advance. The processor 130 may compensate for an image quality factor of an output image to be changed by the grill 20 when the grill 20 is mounted. The image quality factor may include at least one of brightness, resolution, contrast, or color tone of the image, for example.

According to an embodiment, the processor 130 may identify at least one of mounting or a grill type of the grill 20 by identifying proximity, coupling, or stored information of the sensing object 210 provided in the grill 20. For example, the processor 130 may identify at least one of whether the grill is mounted or a type of the grill by reading out grill identification information stored in the sensing object 210. The processor 130 may identify at least one of whether the grill is mounted or the type of the grill by detecting an electrical change due to the mounting of the sensing object 210 through the mounting detection unit (see 190 in FIG. 2).

According to an embodiment, the processor 130 may include at least one of, for example, a central processing unit (CPU), a graphics processing unit (GPU), a microprocessor, an application processor, an application specific integrated circuit (ASIC), and Field programmable gate arrays (FPGAs), and may have a plurality of cores. The processor 130 may execute operations or data processing related to control and/or communication of at least one other component of the electronic device 10. According to an embodiment, a memory may be further included. The memory may be a volatile memory (e.g., RAM, etc.), a non-volatile memory (e.g., ROM, flash memory, etc.), or a combination thereof.

Figure 2:
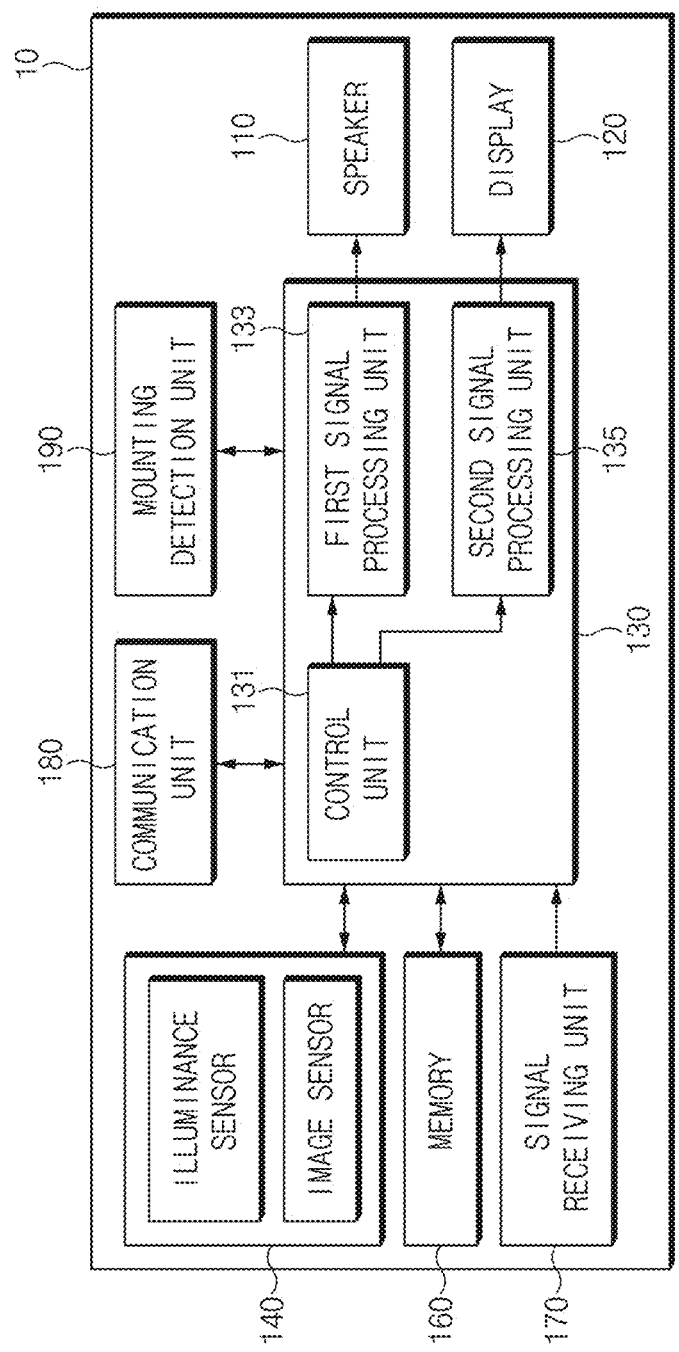
FIG. 2 is a configuration diagram of an electronic device according to one embodiment.

FIG. 2 is a configuration diagram of an electronic device according to an embodiment.

As illustrated in FIG. 2, the electronic device 10 according to an embodiment may include a memory 160, a signal receiving unit 170, a communication unit 180, a mounting detection unit 190, a sensor unit 140, the processor 130, the speaker 110, and the display 120. The processor 130 may include a control unit 131, a first signal processing unit 133, and a second signal processing unit 135. Each component of the processor 130 may be a separate hardware module or a software module implemented by at least one processor. For example, functions respectively performed by the modules included in the processor 130 may be performed by a single processor, or may be individually performed by a separate processor. At least one component of the memory 160, the signal receiving unit 170, the communication unit 180, the mounting detection unit 190, the sensor unit 140, the control unit 131, the first signal processing unit 133 or the second signal processing unit 135 may be omitted. In various embodiments, some of the components may be omitted, additional components may be further included, or some of the components may be combined to form a single entity, and may perform the same functions as those of relevant components before the combination.

According to an embodiment, the memory 160 may store at least one of the number of grills or grill type information. The memory 160 may store first and second compensation values corresponding to each grill type. For example, the memory 160 may be a nonvolatile memory such as a flash memory, a hard disk, or the like.

According to an embodiment, the first compensation value may be a value to compensate for attenuation of a particular frequency band due to the grill 20. The first compensation value may be set through an experiment in which, a changed sound quality in a state of being covered by the grill 20 is adjusted to a sound quality in a state without the grill 20 by adjusting an amplification factor for each frequency band of an equalizer. For example, because the grill 20 may reduce medium and high frequency bands of output sound (e.g., 1 kHz to 10 kHz), the first compensation value may be a set value for the equalizer, which increases the medium and high frequency bands of the sound.

According to an embodiment, the second compensation value may be a value for compensating for a changed image quality due to the grill 20. The second compensation value may be experimentally set by changing image quality factors of the display 120 while identifying an image quality with naked eyes in a state of being covered by the grill 20 as compared with a state of not being covered by the grill 20. The second compensation value may include at least one of, for example, a brightness compensation value, a contrast compensation value or a saturation compensation value.

The brightness compensation value of the second compensation values may be set to increase a brightness of an image when the grill 20 is mounted, compared with, for example, when the grill 20 is not mounted. The brightness compensation value may be set, for example, in consideration of characteristics of a color of the grill. For example, the brightness compensation value may be set such that a brightness of the output image increases as a brightness of color of the grill decreases or a transmittance of light of the grill decreases. The brightness compensation value may be variably applied by considering ambient illuminance. For example, the brightness compensation value may be variably applied such that the brightness of the output image increases as the ambient illuminance decreases.

The contrast compensation value of the second compensation values may be set to lower contrast of the output image when the grill 20 is mounted, for example, as compared with before the grill 20 is mounted. For example, the contrast compensation value may be set to improve visual connectivity between the display 120 and a front frame of the electronic device 10 depending on the color, aperture ratio, and material of the grill applied to the electronic device 10.

The saturation compensation value among the second compensation values may be set to decrease the saturation of each pixel of an image corresponding to, for example, the color of the grill. For example, when the grill 20 has a blue series color, the saturation compensation value corresponding to the grill may be set to decrease the saturation of B (blue) in the image.

According to an embodiment, the signal receiving unit 170 may include an interface that receives a sound source and an image. For example, the signal receiving unit 170 may receive sound sources and images through HDMI, DVI, or RGB connectors or the like, respectively. The sound source output from the signal receiving unit 170 may be compensated and signal-processed by the first signal processing unit 133 and output to the speaker 110. The image output from the signal receiving unit 170 may be compensated and signal-processed by the second signal processing unit 135 and output to the display 120.

According to an embodiment, the sensor unit 140 may sense or measure surrounding environment according to an instruction from the control unit 131, and output sensing (or measurement) information. The control unit 131 may variably apply the second compensation value using the sensing information or identify a type of the grill. For example, the sensor unit 140 may include at least one of an ultrasonic sensor, an infrared sensor, an illuminance sensor, a proximity light sensor, and/or an image sensor.

The illuminance sensor may be driven according to an instruction from the control unit 131 to measure ambient illuminance of a place where the electronic device 10 is installed. For example, the illuminance sensor may measure illuminance before and after mounting the grill 20 according to an instruction from the control unit 131. The illuminance sensor may be provided at a position where illuminance changed before and after mounting the grill 20 may be measured. For example, the illuminance sensor may be provided between the display 120 and the grill 20. The second signal processing unit 190 may apply the second compensation value differently depending on whether the grill 20 is mounted or not according to an instruction from the control unit 131. According to an embodiment, the illuminance sensor may be omitted. For example, when the control unit 131 does not correct the second compensation value in consideration of a change in illuminance, the illumination sensor may be omitted.

The image sensor may photograph at least a partial area in which the grill 20 is mounted before and after mounting the grill 20 according to an instruction from the control unit 131. The control unit 131 may calculate at least one information of the color, the aperture ratio, and the material of the grill from images obtained by photographing at least the partial area before the grill is mounted and after the grill is mounted, and determine a type of the grill based on the calculated at least one piece of information. The driving of the control unit 131 according to the determined type of the grill will be described later.

According to an embodiment, the communication unit 180 may interface with a remote controller. In an embodiment, when the user requests determination of compensation (compensation or non-compensation) for at least one of sound quality or image quality due to the mounting of the grill 20 through a remote controller or the like, the communication unit 180 may receive a request of the user through the remote controller. In this case, the control unit 131 may perform control so as to compensate for or not compensate for at least one of the sound quality or the image quality according to the user's request. Alternatively, the request of the user may be transmitted through a key input unit provided in the electronic device 10. As another example, the communication unit 180 may include an interface connected to an external device or server through various communication methods such as Bluetooth, Wi-Fi, or the like to receive at least one of an image or a sound source in a wireless manner.

According to an embodiment, the mounting detection unit 190 may include at least one of a Hall sensor, a reader (e.g., an RFID reader), an NFC module, or a sensing circuit. In an embodiment, the sensing object 210 of the grill 20 is a magnetic body and the mounting detection unit 190 may be a Hall sensor that detects proximity of the magnetic body. In this case, the control unit 131 may determine that the grill 20 is mounted on the electronic device 10 when detecting proximity of the magnetic body by the Hall sensor. As another embodiment, the sensing object 210 of the grill 20 may be an RFID tag that stores unique identification information of the grill and the mounting detection unit 190 may be an RFID reader that reads out the unique identification information of the grill from the RFID tag. In this case, the control unit 131 may determine whether or not the grill is mounted using the unique identification information of the grill, or identify the type of the grill. Alternatively, the sensing object 210 may be an NFC module that stores the unique identification information of the grill, and the mounting detection unit 190 may be an NFC communication module that reads out the unique identification information of the grill stored in the sensing object 210. In this case, the control unit 131 may determine whether or not the grill is mounted or identify the type of the grill, using the unique identification information of the grill. As another embodiment, the grill 20 may include a coupling member (e.g., a jack), and the mounting detection unit 190 may include a detection circuit that coverts an electrical change due to proximity or mounting of the sensing object 210 to a state transition of at least one signal. In this case, the control unit 131 may determine whether the grill is mounted or may identify the type of the grill by using the electrical change through the sensing circuit. According to an embodiment, the control unit 131 may allow the first and second signal processing units 133 and 135 to apply the first and second compensation values according to the grill 20 to an output sound source and an output image respectively when the grill 20 is mounted. A method of determining, by the control unit 131, whether the grill 20 is mounted using the mounting detection unit 190 has been described above along with the description of the mounting detection unit 190, and a detailed description thereof will be omitted.

According to an embodiment, the control unit 131 may manually determine whether the grill is mounted by identifying key operation of the user. For example, the control unit 131 may detect an operation type of a key input unit (not illustrated) provided in the electronic device 10 to determine whether the grill is mounted. Alternatively, the control unit 131 may determine whether the grill is mounted by detecting operation for keys of the remote controller by the user through the communication unit 180.

According to an embodiment, the control unit 131 may identify the type of the grill through at least one of the mounting detection unit 190 and the sensor unit 140. For example, it has been described above that the type of the grill is identified through at least one of the RFID module, the NFC module, the coupling member, the metal member, and the image sensor, and therefore, a detailed description thereof will be omitted.

In an embodiment, the control unit 131 may identify the information stored in the sensing object 210 through the mounting detection unit 190 to identify the type of the grill. For example, the control unit 131 may identify the type of the grill by identifying the unique identification information of the grill stored in the RFID tag of the grill 20 by the mounting detection unit 190.

In another embodiment, the control unit 131 may identify the type of the grill by identifying whether there is a signal state transition, the type or number of the state-transitioned signals, and the like using the socket-type mounting detection unit 190. For example, when the sensing object 210 is a jack (e.g., Ear-jack) having different lengths and number of terminals for each type of grill, the control unit 131 may identify the type of the grill using a plurality of signal state transitions according to jacks fitted into the socket. Embodiments in which the control unit 131 detects whether or not the grill 20 is mounted and the type of grill by using the mounting detection unit 190 will be described later with reference to FIGS. 3A to 3E.

As another embodiment, the control unit 131 may identify a type of the grill by figuring out the characteristics (e.g., color, shape, material, coupling structure, etc.) of the sensing object using at least one of the mounting detection unit 190 and the sensor unit 140. For example, the control unit 131 may calculate at least one piece of information of a color, an aperture ratio, and a material of the grill using sensing information (e.g., a photographed image) from the sensor unit 140 (e.g., an image sensor) and identify a type of the grill using the at least one piece of information. A process in which the control unit 131 calculates at least one piece of information and calculates a type of a grill using at least one piece of information will be described later with reference to FIG. 6.

According to an embodiment, the control unit 131 may determine first and second compensation values corresponding to a type of a grill, and allow the first and second signal processing units 133 and 135 to compensate a sound source and an image to be output using the determined first and second compensation values.

According to an embodiment, the control unit 131 may variably apply at least one of the first compensation value or the second compensation value stored in the memory 160 based on the sensing information of the sensor unit 140. For example, the control unit 131 may change a brightness compensation value of the second compensation values so as to increase a brightness of the output image when it is identified based on the sensing information that ambient illuminance is dark, and decrease the brightness of the output image when it is identified that the ambient illuminance increases. When it is identified based on the sensing information that the brightness of the color of the grill decreases and the light transmittance decreases, the control unit 131 may change (e.g., increase) the brightness compensation value of the second compensation values so as to increase the brightness of the output image in response to the decrease in the brightness of the color of the grill and the decrease in the light transmittance. An example in which the control unit 131 varies the first and second compensation values according to the type of the grill will be described later with reference to FIG. 4.

According to an embodiment, the control unit 131 may control the display 120 or the second signal processing unit 135 such that the display 120 outputs a graphic art image corresponding to a grill pattern according to the type of the grill 20. The graphic art image may be a predetermined image corresponding to a type of the grill. For example, when the grill 20 is configured in a grid pattern, the graphic art image may be an image completed by being combined with the grid pattern of the grill 20 on the display 120.

According to an embodiment, the first signal processing unit 133 may compensate the output sound source using the first compensation value under the control of the control unit 131 to compensate for a change in the sound source or attenuation in a specific frequency due to the grill 20 to some extent. The first compensation value may be a value for amplifying sound in a predetermined frequency band (for example, a medium and high frequency band) to be attenuated by the grill 20 by an amount attenuated by the grill 20. For example, the first signal processing unit 133 may be an equalizer that amplifies a signal in a set frequency band by a magnitude corresponding to the first compensation value. As described above, according to the embodiment, a change in the sound quality due to the grill 20 may be compensated for to some extent. The set frequency band may be a band in which the frequency characteristics are changed (e.g., dip, peak) by each grill 20 in a band of 1 kHz to 10 kHz. The first compensation value may be, for example, an equalizer value for flattening dips or peak of the set frequency band.

According to an embodiment, the first compensation value may include a plurality of compensation values corresponding to a multi-channel speaker. Accordingly, when the sound source is output to the multi-channel speaker, the first signal processing unit 133 according to the embodiment may compensate each sound source output to the multi-channel speaker using a plurality of compensation values.

According to an embodiment, the second signal processing unit 135 may compensate an image quality factor of each pixel of the output image using the second compensation value. For example, the second signal processing unit 135 may compensate at least one image quality factor among a brightness, a contrast, a resolution, and a color tone of each pixel of an image corresponding to the second compensation value. Thus, according to an embodiment, a change in the image quality of the display 120 due to the grill 20 may be compensated for to some extent.

According to another embodiment, the grill 20 may cover a portion of the output part of the display 120 and the speaker 110 rather than the entire output part, depending on the type of the grill. For example, the grill 20 may be mounted on the electronic device 10 in an arrangement that covers only a portion of the display 120. In such a case, the second signal processing unit 135 may compensate only the pixels corresponding to a part of the display 120 in the output image. For example, when the grill 20 is mounted so as to cover only some pixels of an outer portion of the display 120, the second signal processing unit 135 may compensate at least one image quality using the second compensation value for only the outer pixels of the display 120 among an input image and may not compensate image quality factors for the remaining pixels. In this case, the second compensation value may be stored in the memory 160 in association with pixel coordinates to be compensated (e.g., coordinates of pixels covered by the grill 20). Accordingly, the second signal processing unit 135 may compensate only pixels corresponding to the pixel coordinates associated with the second compensation value in the output image.

Various embodiments may compensate sound quality and picture quality which vary according to a type of a grill covered on a product in which the speaker and the display are combined. Various embodiments may automatically detect whether a grill is mounted and a type of grill and compensate the sound quality and the image quality.

Figure 3A:
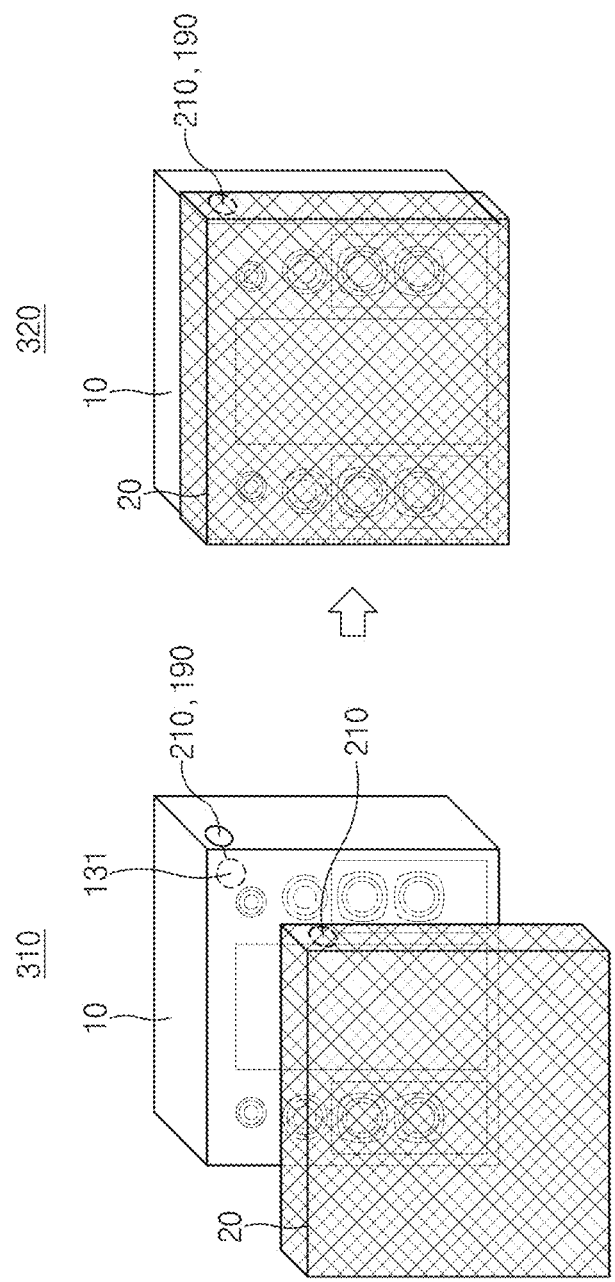
FIGS. 3A to 3E are diagrams for describing a method of identifying a predetermined grill according to an embodiment.
Figure 3B:
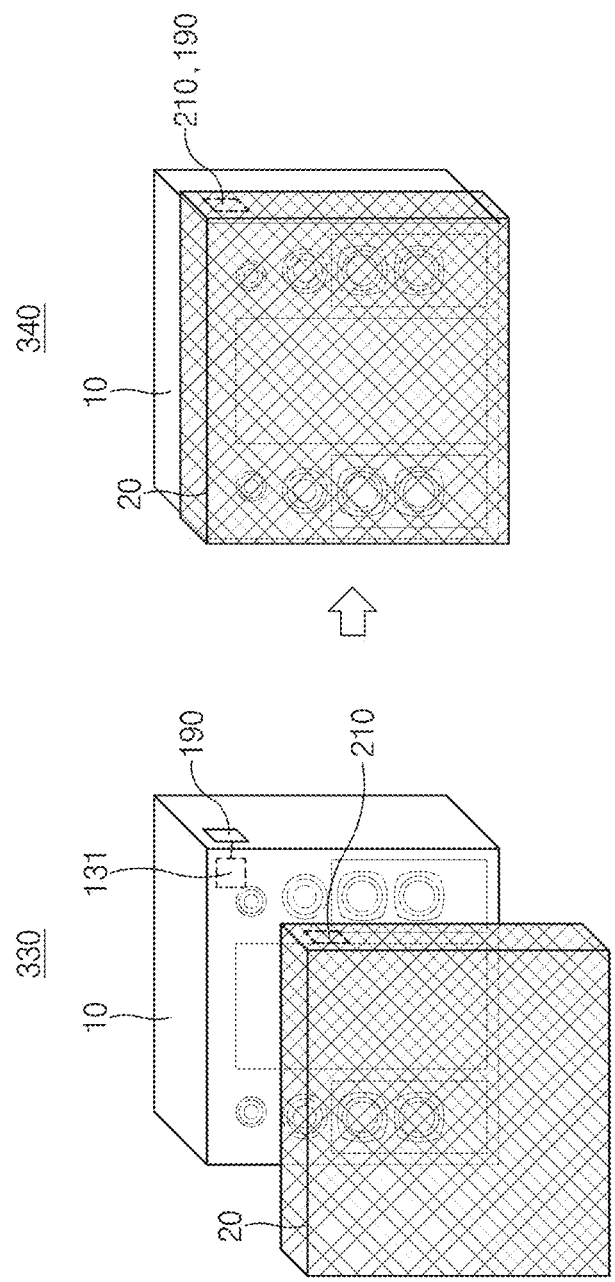
Figure 3C:
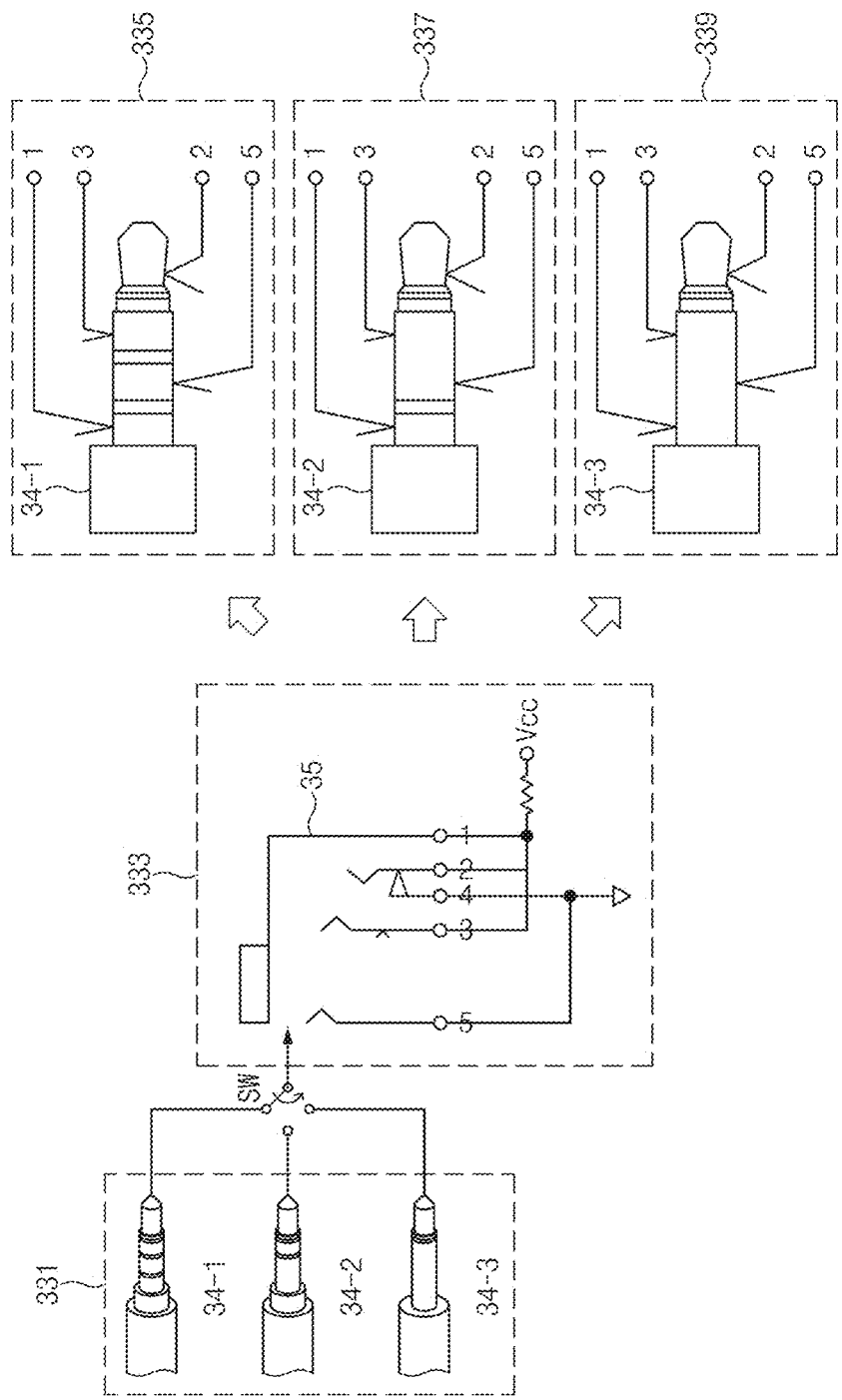
Figure 3D:
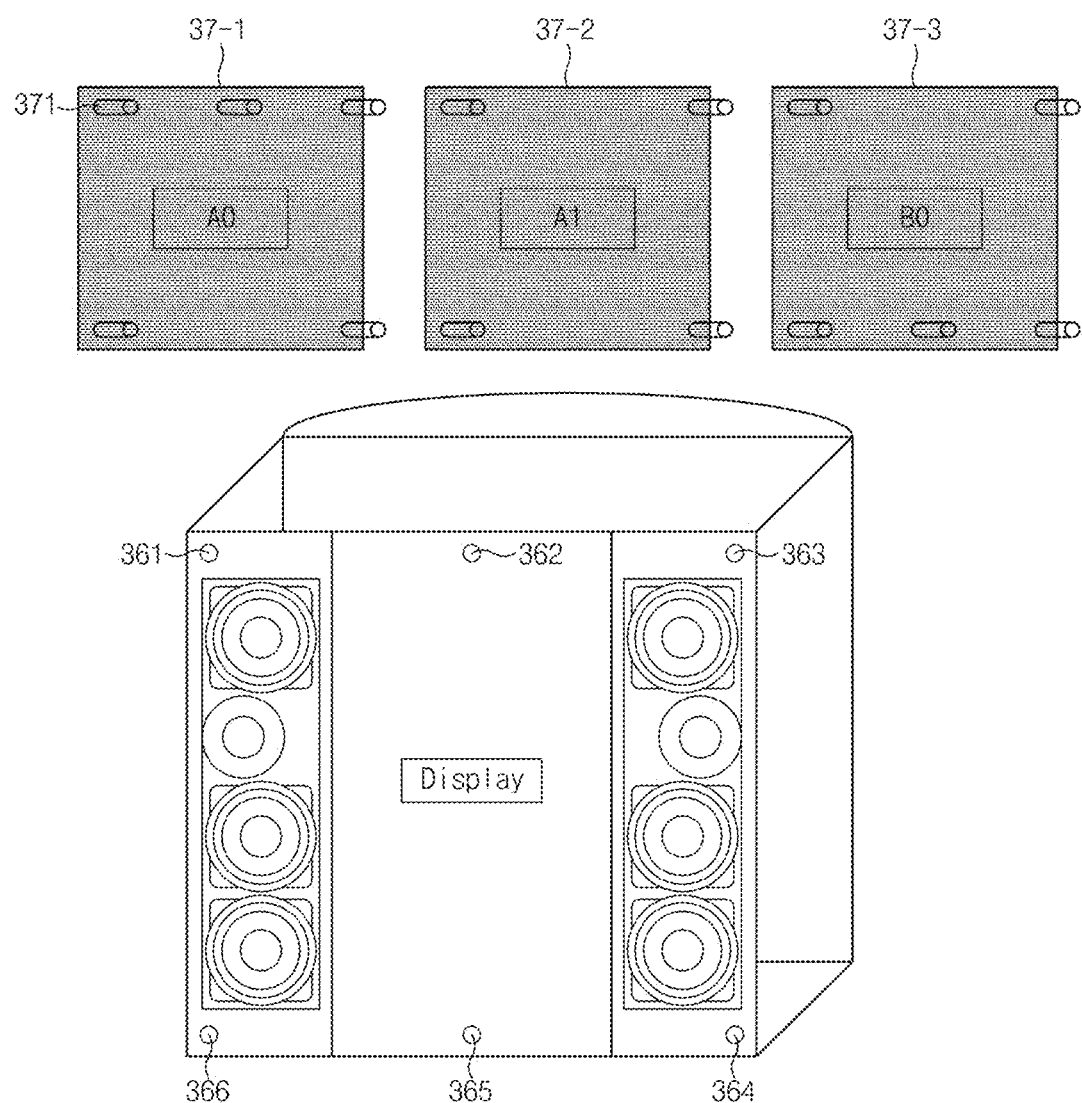
Figure 3E:
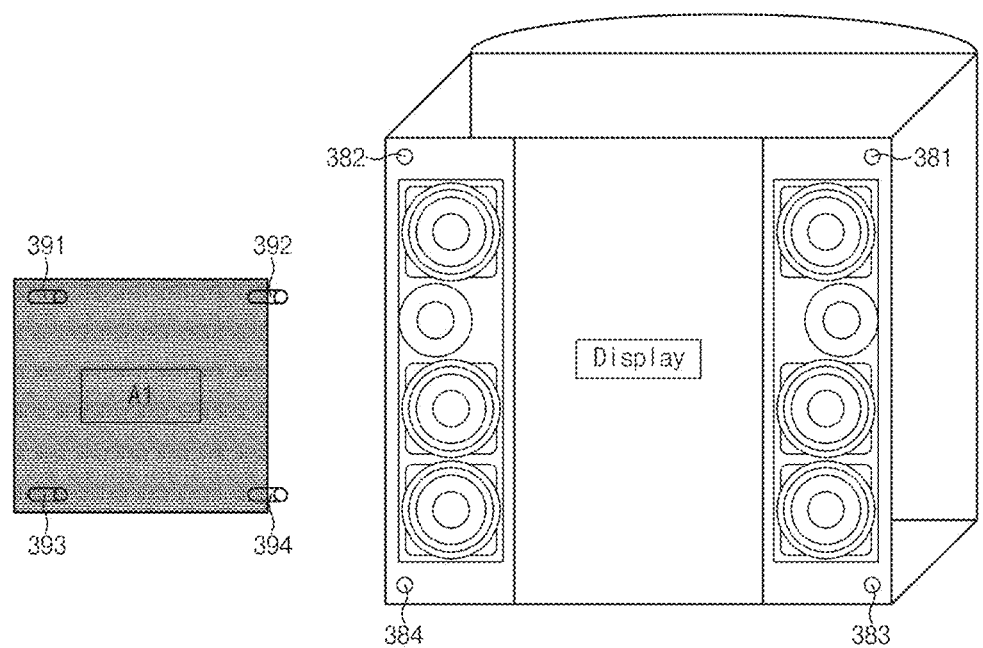

FIGS. 3A to 3E are diagrams for describing a method of identifying a predetermined grill according to an embodiment. FIG. 3A is a diagram illustrating a method of identifying whether a grill is mounted, using a Hall sensor according to an embodiment. FIG. 3B is a diagram illustrating a method of identifying a type of a grill using an RFID tag and a reader according to an embodiment. FIG. 3C is a diagram illustrating a method of identifying a type of a grill using a jack and a socket according to an embodiment, and FIGS. 3D and 3E are diagrams illustrating a method of identifying a type of a grill using a metal member (e.g., a projection and a hole) according to an embodiment. In FIG. 3C, an ear-jack socket is shown as an equivalent circuit for convenience of description.

According to an embodiment, when the grill 20 is of one type, the control unit 131 may determine whether or not the grill 20 is mounted. Referring to FIG. 3A, as shown in state 310, the sensing object 210 of the grill 20 is a magnetic body provided inside (or outside) the side surface of the grill 20, and the mounting detection unit 190 of the electronic device 10 may be a Hall sensor for detecting proximity of a magnetic body. As shown in state 320, the Hall sensor is provided at a position facing the magnetic body mounted on the grill 20 when the grill 20 is mounted on the electronic device 10, thereby making it possible to detect whether the grill 20 is mounted on the electronic device 10. The control unit 131 may determine whether the grill 20 is mounted on the electronic device 10 based on a signal from the Hall sensor because the Hall sensor outputs different signals depending on proximity of the magnetic body.

According to an embodiment, when there are a plurality of types of grills 20, the control unit 131 may identify a type of the grill. For example, the control unit 131 may identify a type of the grill using information stored in the sensing object 210 which is identified by the mounting detection unit 190, characteristics of the sensing object 210 sensed by the mounting detection unit 190 or the sensor unit 140 or a signal state transition in a sensing circuit of the mounting detection unit 190. Hereinafter, description will be given with reference to FIGS. 3B to 3E.

Referring to FIG. 3B, according to an embodiment, the sensing object 210 may be a tag (e.g., an RFID tag or an NFC tag) that stores grill identification information of a grill, and the mounting detection unit 190 may be a reader (e.g., an RFID reader, an NFC communication unit). The tag and the reader may be provided at positions corresponding to each other when they are mounted on the grill 20 and the electronic device 10. When the tag approaches the reader as the grill 20 approaches the electronic device 10, the reader may read out the unique identification information 31 of the grill from the tag. Then, the control unit 131 may identify the grill identification information stored in the tag through the reader, and identify a type of the grill using the identified grill identification information. Like the embodiment, a method of identifying the type of the grill by identifying the grill identification information stored in the sensing object 210 in the control unit 131 may be used when the grill 20 is of a single type.

As in FIG. 3C, the sensing object 210 of the grill 20 according to an embodiment may be a jack according to a type of a grill and the mounting detection unit 190 of the electronic device 10 may include a socket 35 and at least one sensing circuit (not illustrated). In FIG. 3C, block 331 illustrates a plurality of jacks, block 333 illustrates a socket, and blocks 335 through 337 illustrate a plurality of jacks connected to a socket. FIG. 3C is merely an example for describing an embodiment for distinguishing types of grills by shapes of jacks and sockets, and a connection form of the jack and the socket may be different in consideration of a leakage current of a circuit and the like.

Referring to block 331, the sensing object 210 of the grill 20 may be a jack having a different number or length of terminals for each type of a grill. For example, when the grill 20 is three types of first to third grills, the first grill may be provided with a first jack 34-1, the second grill may be provided with a second jack 34-2, and the third grill may be provided with a third jack 34-3. As in block 331, the first to third jacks 34-1 to 34-3 may be, for example, ear jacks having different numbers and different lengths of terminals which are vertically arranged.

Referring to block 333, the socket 35 may be a socket configured to be engageable with the jacks 34-1 to 34-3 provided in the grill 20, for example, an ear jack socket having first to fifth pins. Each pin of the socket 35 may have a different state by a jack mounted on the socket 35 and a peripheral circuit (e.g., a pull-up or pull-down circuit). For example, the first, second, and third pins of the socket 35 may be pulled up and the fourth and fifth pins may be connected to the ground, as shown in the second row of Table 1 below. The second and fourth pins of the socket 35 may be connected to each other when the jacks 34-1 to 34-3 are not mounted and may be spaced apart from each other when one of the jacks 34-1 to 34-3 is mounted. The control unit 131 may determine whether the jacks 34-1 to 34-3 are mounted using the state of the second pin of the socket 35 because the state of the second pin is different depending on whether the jack is mounted, as shown in the third row of Table 1. When the jacks 34-1 to 34-3 are not mounted in the socket 35, the second pin may be connected to the fourth pin and thus, may be in a low state due to the influence of the ground of the fourth pin. On the other hand, when the jacks 34-1 to 34-3 are mounted in the socket 35, the second pin that is pulled up may not be connected to the grounded fourth pin, and thus may be in a high state by pulling up. The control unit 131 may determine that the grill 20 is mounted when the state of the second pin is low and determine that the grill 20 is not mounted when the state of the second pin is high.

TABLE 1

|  |  | Socket pin number | | | | |
| --- | --- | --- | --- | --- | --- | --- |
|  | Pin state | 2 Pull up | 4 GND | 1 Pull up | 3 Pull up | 5 GND |
| Jack non-mounting | Connection between pins | Connected | | | | |
|  | Control unit | low | low | high | high | low |
| First jack Mounting | Connection between pins | | | | | |
|  | Control unit | high | low | high | high | low |
| Second jack Mounting | Connection between pins | | | | Connected | |
|  | Control unit | high | low | high | low | low |
| Third jack Mounting | Connection between pins | | | | Connected | |
|  | Control unit | high | low | low | low | low |

When the grill 20 is mounted on the electronic device 10 as in the blocks 335 to 337, one of the first to third jacks 34-1 to 34-3 (see arrow directions in FIG. 3C) may be mounted in the socket 35 according to operation of a user. In this case, depending on a type of the jack connected to the socket 35, the connection relationship between the first, third, and fifth pins of the socket 35 may vary. Accordingly, the control unit 131 may identify a type of the mounted grill 20 by using the signal states of the first, third, and fifth pins of the socket 35.

Referring to block 335, when the first jack 34-1 is mounted in the socket 35, the first, third, and fifth pins may not be connected to each other and thus, the states of the pins may be respectively maintained in high, high, and low states.

When the second jack 34-2 is mounted in the socket 35 as shown in block 337, the first pin may not be connected to the other pins and remain in a previous state, and the third and fifth pins may be electrically connected to each other and thus, the first, third, and fifth pins may be in the high, low, and low states, respectively.

When the third jack 34-3 is mounted in the socket 35 as shown in block 339, the first, third, and fifth pins may be electrically connected to each other and thus, the first, third, and fifth pins may all be in the low state. As described above, depending on a type of a jack connected to the socket 35, the first, third, and fifth pins may be in different states. Therefore, when different jacks are used for different types of grills, the types of grills may be identified.

In the structure of FIG. 3C, the control unit 131 may detect a type of a grill using an electrical change in at least one pin of the socket 35 corresponding to a jack connected to the socket 35 among the first to third jacks 34-1 to 34-3 to detect the type of the grill. For example, the control unit 131 may determine that a type of the grill is the first grill when the first, third, and fifth pins are in the high, high, and low sates, determine that the type of the grill is the second grill when the first, third, and fifth pins are in the high, low, and low states and determine that the type of the grill is the third grill when the first, third, and fifth pins are in the low, low, and low sates. The first, third, and fifth pins of the socket 35 may be directly connected to the control unit 131 or may be connected to the control unit 131 through at least one sensing circuit (not shown).

In the above-described embodiment, the case where a type of the grill is identified by a type of the jack mounted in one socket 35 has been described as an example. Alternatively, a plurality of sockets may be applied in other embodiments. Thus, in other embodiments, the number of identifiable types of grills may increase.

The jacks 34-1 to 34-3 may be provided on a first surface (e.g., a front surface or a side surface) of the grill 20 to be coupled with the electronic device 10, for example, the socket 35 may be provided in a portion corresponding to the first surface. Thus, when the grill 20 is mounted on the electronic device 10, the socket 35 may be engaged with the jacks 34-1 to 34-3.

Referring to FIG. 3D, according to an embodiment, the control unit 131 may identify a type of the grill using a position of a coupling portion of the grill. The grill 20 may have a plurality of protrusions of conductive material in which at least one of the positions of the protrusions or the number of protrusions is different depending on a type thereof. The electronic device 10 may be provided with a number of holes at a number of positions, capable of being engaged with all kinds of grills provided therein, and each of the holes may be provided with a sensing circuit configured to be transited to a state different from that before mounting when a conductive protrusion is mounted therein.

For example, among three kinds of grills (first to third grills), a first grill 37-1 and a third grill 37-3 may have a total of five protrusions having different positions of which one protrusion is arranged at different positions and a second grill 37-2 may have a total of four protrusions. The electronic device 10 may have six holes 361 to 366 capable of being respectively engaged with the projections 371 of the first to third grills 37-1 to 37-3. According to an embodiment, the control unit 131 may identify a type of the grill mounted on the electronic device 10 by identifying a hole to which the protrusion of the grill 20 is inserted among the six holes 361 to 366 through a transition in the electrical state thereof.

Referring to FIG. 3E, the grill 20 may have a plurality of protrusions 391 to 394 of the same number but the protrusions 391 to 394 may have different materials depending on a type. The plurality of protrusions 391 to 394 may include at least one protrusion of conductive material, and may include a protrusion of non-conductive material. The protrusion of conductive material may be the sensing object 210 or may be connected directly or indirectly (e.g., via a connector) with the sensing object 210. The electronic device 10 may include a plurality of holes 381 to 384 coupled with the plurality of projections 391 to 394. Each hole may be provided with a sensing circuit (e.g., an ear jack type mounting detection unit) of which a state is electrically transited when coupled with the protrusion of conductive material. The control unit 131 may distinguish the types of grills based on the number of protrusions of conductive material among the protrusions coupled with the plurality of holes 381 to 384.

For example, the first and second grills engageable with the electronic device 10 may be each provided with four projections at the same positions, a first grill having one projection of conductive material, and a second grill having two protrusions of conductive material. The control unit 131 may identify a type of the grill by detecting the coupling of the protrusions of conductive material by the sensing circuit connected to the holes coupled with the protrusions of conductive material among the four holes. In FIG. 3E, a total of four protrusions are shown as an example, but the disclosure is not limited thereto.

According to another embodiment, the grill 20 may include a conductive material and a non-conductive material in a portion of a surface coupled with the electronic device 10. The conductive material may be a metallic material and may be applied to a surface of the grill 20 that is coupled to the electronic device 10. In another embodiment, the control unit 131 may determine whether the grill 20 is mounted by detecting a signal state transition due to contact of the conductive material.

Various embodiments may easily identify a type of a grill mounted on a body using at least one of the grill identification information, the grill engagement structure, or the type of the sensing object.

According to an embodiment, an electronic device may include a housing including at least one of a display that displays an image and a speaker that outputs sound, a mounting detection unit disposed on a first surface of the housing to determine whether a grill is mounted, and a processor that compensates at least one of an output image of the display and an output sound source of the speaker depending on whether the grill is mounted, which is detected by the mounting detection unit.

The mounting detection unit may further identify a type of the mounted grill, and the processor may compensate at least one of the output image and the output sound source according to the identified type of the grill.

The grill may include a sensing object, and the processor may determine whether the grill is mounted or identify the type of the grill by detecting proximity of the sensing object through the mounting detection unit or detecting coupling between the mounting detection unit and the sensing object.

The sensing object may include a magnetic body, the mounting detection unit may be a hall sensor, and the processor may determine that the grill is mounted when proximity of the magnetic body is detected using the hall sensor.

The sensing object may include a tag in which grill identification information corresponding to the type of the grill is stored, the mounting detection unit may be a reader that reads out the grill identification information from the tag, and the processor may compare the grill identification information from the tag with grill identification information stored in a memory to determine whether the grill is mounted or the type of the grill.

The sensing object may include a jack, the mounting detection unit may include a socket, the processor may detect coupling between the socket and the jack to determine whether the grill is mounted or the type of the grill.

The sensing object may include at least one protrusion, the mounting detection unit may include at least one hole coupled with the at least one protrusion, and the processor may identify the type of the grill according to at least one of a number, a type, and a position of the protrusion fitted in at least one of the holes.

The electronic device may further comprise a sensor unit, and the processor may compensate the output image or the output sound source according to a type of the grill detected by the sensor unit.

The sensor unit may include an image sensor configured to photograph the grill, and the processor may identify a type of the grill based on at least one of a color and an aperture ratio of the grill, included in an image photographed by the image sensor.

The electronic device may further include a memory configured to store a preset compensation value according to whether the grill is mounted or a type of the grill, and the processor may compensate at least one of the output image and the output sound source using the compensation value.

The electronic device may further include an illuminance sensor configured to sense an ambient illuminance, and the processor may variably apply the compensation value based on the sensed ambient illuminance. The compensation value may include a saturation compensation value that decreases a saturation of each pixel of the output image corresponding to a color of the grill.

The processor may determine whether to compensate at least one of the output image and the output sound source according to a user input.

The grill may cover at least a portion of the display, and the processor may compensate the output image in an area of the display covered by the grill.

Figure 4:
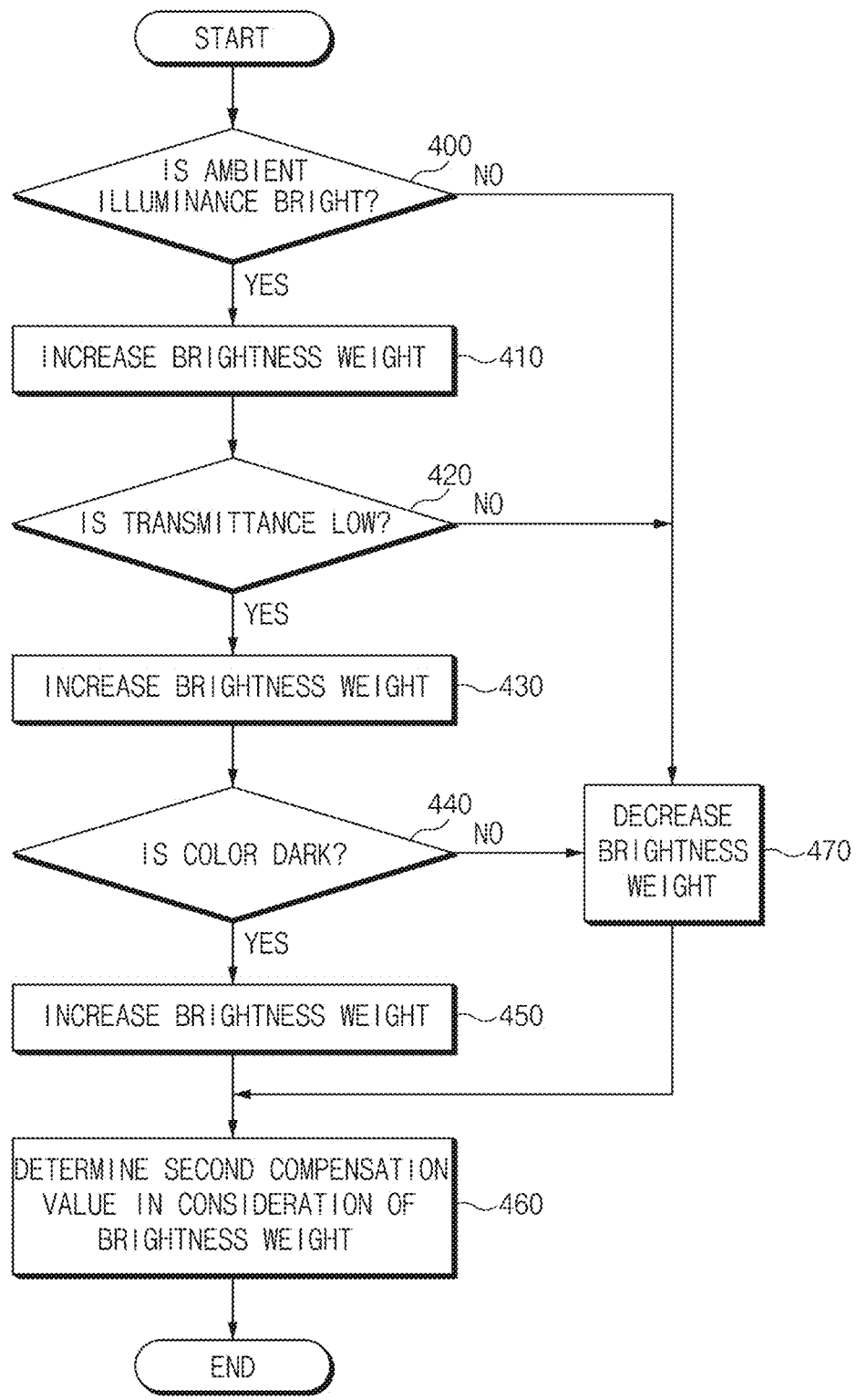
FIG. 4 is a flowchart of a method of determining a second compensation value according to an embodiment.

FIG. 4 is a flowchart of a method of determining a second compensation value according to an embodiment.

In operation 400, the control unit 131 may determine whether ambient illuminance is bright based on illuminance measured by an illuminance sensor when the grill 20 is mounted. For example, when a difference between the measured illuminance and a preset reference illuminance is a positive value, the control unit 131 may determine that the ambient illuminance is bright. When the difference between the measured illuminance and the reference illuminance is a negative value, the control unit 131 may determine that the ambient illuminance is dark. The reference illuminance may be set to an average indoor illuminance value.

In operation 410, when the ambient illuminance is bright, the control unit 131 may increase a brightness weight corresponding to how bright the ambient illuminance is. For example, the control unit 131 may increase the brightness weight as the difference between the measured illuminance and the reference illuminance increases. The degree to which the brightness weight is increased may be determined experimentally.

In operation 420, the control unit 131 may determine whether a transmittance of the applied grill is less than a preset reference transmittance. For example, the transmittance of the applied grill may be calculated by numerically calculating the transmittance of light according to at least one of a material and an aperture ratio. The reference transmittance may be a transmittance of a reference grill used in the calculation of the second compensation value and may be calculated by an experiment for allowing light to pass through the reference grill. A formula for calculating the transmittance according to at least one of the material and the aperture ratio may be determined by an experiment for identifying the transmittance of light with different materials and aperture ratios.

In operation 430, when the transmittance of the applied grill 20 is less than the reference transmittance, the control unit 131 may increase the brightness weight corresponding to the difference between the transmittance of the grill 20 and the reference transmittance. For example, the control unit 131 may increase the brightness weight as the difference between the transmittance of the applied grill 20 and the reference transmittance increases. The degree to which the brightness weight is increased may be determined experimentally.

In operation 440, the control unit 131 may determine whether the brightness of the applied grill is less than a preset reference brightness. For example, the reference brightness may be a color of the reference grill used to calculate the second compensation value which is a default value. The reference brightness and the brightness of the applied grill may be an average brightness calculated from an image photographed under the same illuminance condition.

In operation 450, when the brightness of the applied grill is less than the reference brightness, the control unit 131 may increase the brightness weight corresponding to the difference between the brightness of the grill and the reference brightness. For example, the control unit 131 may increase the brightness weight as the difference between that of the applied grill and the reference brightness increases. The degree to which the brightness weight is increased may be determined experimentally.

In operation 470, when the ambient illuminance is less than the reference illuminance, the control unit 131 may reduce the brightness weight corresponding to a difference between the ambient illuminance and the reference illuminance. When the transmittance of the applied grill is less than the reference transmittance, the control unit 131 may decrease the brightness weight corresponding to the difference between the transmittance of the grill and the reference transmittance. When the brightness of the applied grill is less than the reference brightness, the control unit 131 may decrease the brightness weight corresponding to the difference in brightness of the grill and the reference brightness. In operation 470, the degree to which the brightness weight is decreased may be determined experimentally.

In operation 460, the control unit 131 may determine the second compensation value in consideration of the increased or decreased brightness weight in the operation 410, 430, 450, or 470. According to an embodiment, the second compensation value may be visually determined by comparing a case where the grill is applied and a case where the grill is not applied and adjusting a brightness of the display 120.

Various embodiments may improve a change in the image quality due to the grill to some extent by adjusting an image quality factor corresponding to a type of the grill and the ambient illuminance.

Figure 5:
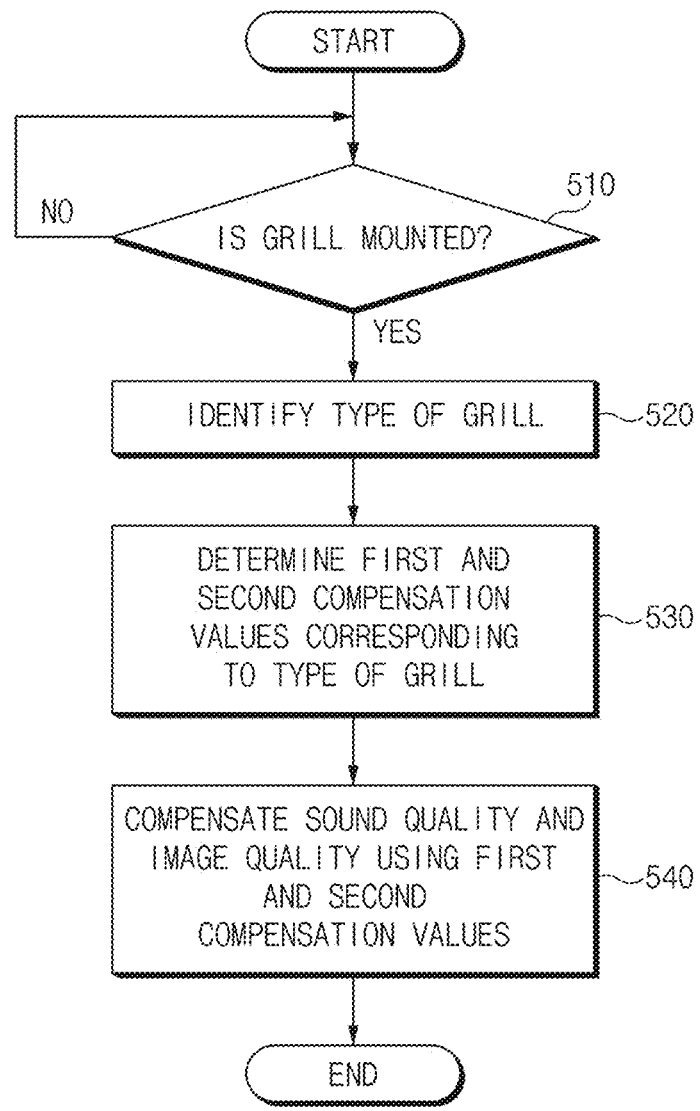
FIG. 5 is a flowchart of a control method of an electronic device according to an embodiment.

FIG. 5 is a flowchart of a control method of an electronic device according to an embodiment.

Referring to FIG. 5, in operation 510, the electronic device 10 may detect mounting of a grill. For example, the electronic device 10 may detect the mounting of the grill by a signal state transition due to whether the grill is mounted or not.

In operation 520, the electronic device 10 may identify a grill type of the mounted grill. For example, the electronic device 10 may identify a type of the grill by reading out unique identification information of the grill stored in the sensing object 210 provided in the grill 20, or identifying the sensing object 210 or characteristic (e.g., a color, a shape, a material, a coupling structure, etc.) of the grill by a sensor.

In operation 530, the electronic device 10 may determine first and second compensation values corresponding to the type of the grill. For example, the electronic device 10 may search for preset first and second compensation values corresponding to identified grill information or grill features. According to an embodiment, the electronic device 10 may variably apply the found first and second compensation values. For example, the electronic device 10 may variably apply the second compensation value corresponding to a type of the grill according to ambient illuminance. As described above, in an embodiment, it is possible to more efficiently compensate for a change in an image quality due to the grill by variably applying the preset second compensation value in consideration of the ambient illuminance.

In operation 540, the electronic device 10 may compensate a sound quality and an image quality, respectively using the first and second compensation values. For example, the electronic device 10 may increase an amplification degree of a set frequency band of the sound source using the first compensation value. The electronic device 10 may correct at least one of a resolution, brightness, contrast, or color tone of the display 120 using the preset second compensation value.

Figure 6:
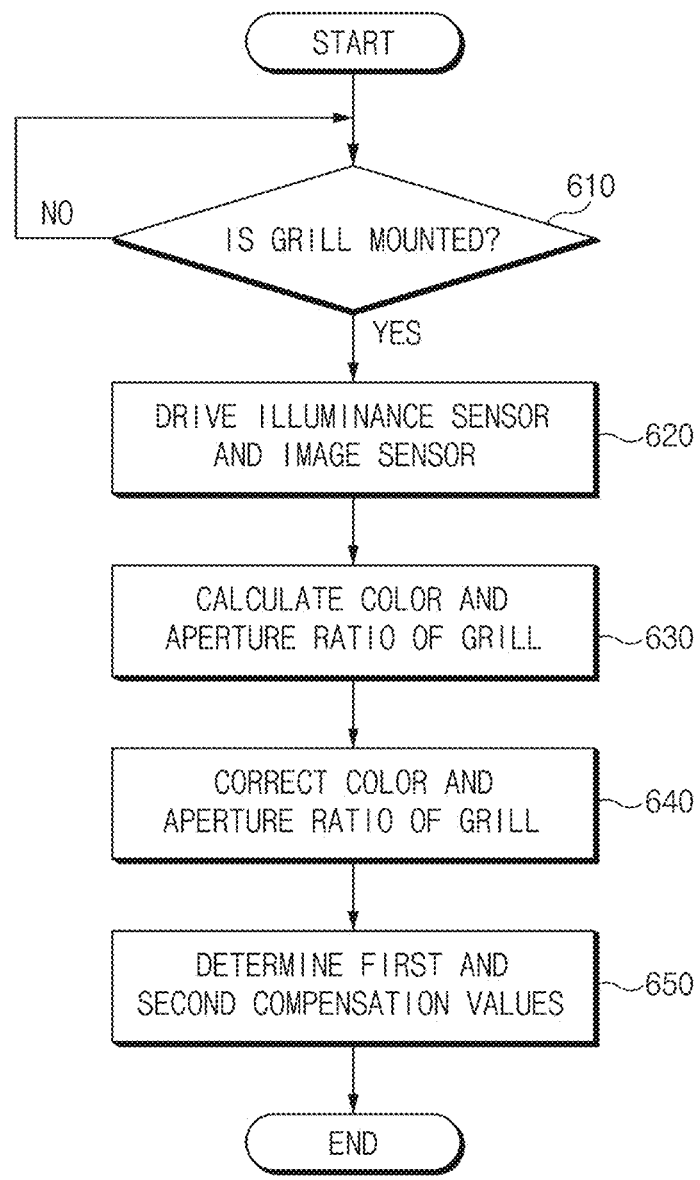
FIG. 6 is a flowchart of a method of identifying a grill according to an embodiment.

FIG. 6 is a flowchart of a method of identifying a grill according to an embodiment. In FIG. 6, an image sensor may be disposed to photograph the display 120 from the outside of the grill 20.

When the control unit 131 may identify mounting of the grill 20 in operation 610, the control unit 131 may drive at least one of a hall sensor, an illuminance sensor, and an image sensor in operation 620. In an embodiment, the control unit 131 may detect whether the grill 20 is mounted through means (e.g., a hall sensor, a mounting detection unit) for detecting a sensing object (e.g., a magnet) of the grill 20 (e.g., a hall sensor, a mounting detection unit).

In operation 630, the control unit 131 may calculate at least one of a color, aperture ratio, or material of the grill from images photographed before and after mounting the grill by the image sensor. For example, the control unit 131 may calculate the color of the grill 20 by using a change in an average pixel value (RGB) of images photographed before and after mounting the grill. The control unit 131 may calculate the aperture ratio of the grill 20 using a change in edges of the images photographed before and after mounting the grill. For example, the image sensor is spaced apart from the grill 20 by a certain distance, and therefore, a certain size of the grill 20 may be photographed. The control unit 131 may calculate the aperture ratio of the grill, determined by a pattern of the grill 20 and the size of the pattern from the change in the edges within a predetermined size. Alternatively, the control unit 131 may detect the material of the grill 20 by using at least one of the aperture ratio, aperture density, and aperture shape of the grill 20 in the photographed images. The aperture shape may be calculated using the change in the edges of the photographed images, and the aperture density may be calculated from the number of apertures in a certain area. For example, when the aperture density is less than a critical density, the aperture ratio is less than a predetermined size, or the aperture shape is not constant, the control unit 131 may determine that the grill 20 is made of cloth, and when the aperture density is equal to or greater than the critical density, the aperture ratio is equal to or greater than the predetermined size or the aperture shape is constant, the control unit 131 may determine that the grill 20 is made of a metal material. In operation 640, the control unit 131 may correct at least one of the color, aperture ratio, or material of the grill 20 based on the ambient illuminance measured by the illuminance sensor. For example, the control unit 131 may correct the color and the aperture ratio of the grill with reference to a color correction value and an aperture ratio correction value according to the illuminance in the memory 160. The color correction value may be determined by identifying a change in RGB of the photographed images according to the color of the grill at a variety of illuminance. The aperture ratio correction value may be determined by identifying a change in the edges of the photographed images according to the aperture ratio of the grill at a variety of illuminance.

In operation 650, the control unit 131 may select a type of the grill, of which at least one of the identified color, aperture ratio, or material is most similar among the first and second compensation values according to types of grills in the memory 160, and select the first and second compensation values of the selected type of the grill. For example, the control unit 131 may select a type of a grill which has the same as or relatively most similar to the color value identified from the photographed images among types of grills included in the memory 160. The control unit 131 may identify the grill which has the same as or relatively most similar to the aperture ratio identified from the photographed images among the types of grills included in the memory 160. The control unit 131 may select a type of a grill which has a material identified from the photographed images among the types of grills included in the memory 160. When a plurality of types of grills are selected by at least one of the color, the aperture ratio, and the material, the control unit 131 may select a type of a grill of which at least one of the color, the aperture ratio, or the material has a largest similarity. In an embodiment, the control unit 131 may allow the first and second signal processing units 133 and 135 to compensate at least one of the output sound source or the output image according to the first and second compensation values.

In another embodiment, the aperture ratio and color of the grill 20 mounted on the electronic device 10 may be detected based on the measured information (e.g., the illuminance and the photographed images) using the sensor unit 140, and first and second correction values for the grill 20 that are unknown based on the detected aperture ratio and color may be determined.

Figure 7:
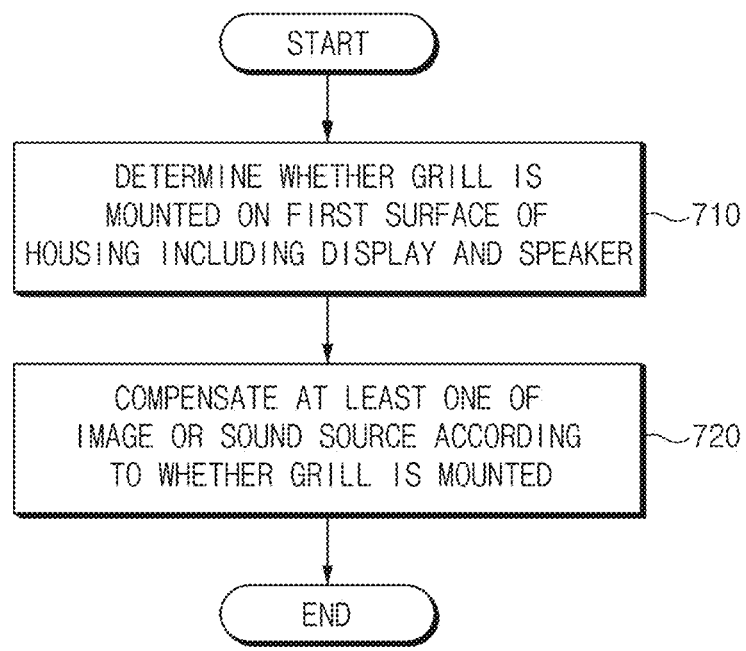
FIG. 7 is a flowchart of a control method of an electronic device according to an embodiment.

FIG. 7 is a flowchart of a control method of an electronic device according to an embodiment.

Referring to FIG. 7, in operation 710, the processor 130 may determine whether a grill is mounted on a first surface of a housing including a display and a speaker.

In operation 720, the processor 130 may compensate at least one of an image or a sound source to be output depending on whether the grill is mounted.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter. A module or a program module according to various embodiments may include at least one or more of the above-described components, a part of the above-described components may be omitted, or other components may be further included.

According to various embodiments, operations executed by modules, program modules, or other components may be executed by a successive method, a parallel method, a repeated method, or a heuristic method, or at least one part of operations may be executed in different sequences or omitted. Alternatively, other operations may be added. While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing including at least one of a display that displays an image and a speaker that outputs sound;
a mounting detection unit disposed on a first surface of the housing to determine whether a grill is mounted; and
a processor configured to compensate at least one of an output image of the display and an output sound source of the speaker depending on whether the grill is mounted, which is detected by the mounting detection unit.

2. The electronic device of claim 1,
wherein the mounting detection unit further identifies a type of the mounted grill, and
wherein the processor is configured to compensate at least one of the output image and the output sound source according to the identified type of the grill.

3. The electronic device of claim 2,
wherein the grill includes a sensing object, and
wherein the processor is configured to determine whether the grill is mounted or identify the type of the grill by detecting proximity of the sensing object through the mounting detection unit or detecting coupling between the mounting detection unit and the sensing object.

4. The electronic device of claim 3, wherein the sensing object includes a magnetic body,
wherein the mounting detection unit is a hall sensor, and
wherein the processor is configured to determine that the grill is mounted when proximity of the magnetic body is detected using the hall sensor.

5. The electronic device of claim 3, wherein the sensing object includes a tag in which grill identification information corresponding to the type of the grill is stored,
wherein the mounting detection unit is an RFID reader configured to read out the grill identification information from the tag, and
wherein the processor is configured to compare the grill identification information from the tag with grill identification information stored in a memory to determine whether the grill is mounted or the type of the grill.

6. The electronic device of claim 3, wherein the sensing object includes a jack,
wherein the mounting detection unit includes a socket, and
wherein the processor is configured to detect coupling between the socket and the jack to determine whether the grill is mounted or the type of the grill.

7. The electronic device of claim 3, wherein the sensing object includes at least one protrusion,
wherein the mounting detection unit includes at least one hole coupled with the at least one protrusion, and
wherein the processor is configured to identify the type of the grill according to at least one of a number, a type, and a position of the protrusion fitted in at least one of the holes.

8. The electronic device of claim 1, wherein the electronic device further comprises a sensor unit, and
wherein the processor is configured to compensate the output image or the output sound source according to a type of the grill detected by the sensor unit.

9. The electronic device of claim 8, wherein the sensor unit includes an image sensor configured to photograph the grill, and
wherein the processor is configured to identify a type of the grill based on at least one of a color and an aperture ratio of the grill, included in an image photographed by the image sensor.

10. The electronic device of claim 1, further comprising:
a memory configured to store a preset compensation value according to whether the grill is mounted or a type of the grill,
wherein the processor is configured to compensate at least one of the output image and the output sound source using the compensation value.

11. The electronic device of claim 10, further comprising:
an illuminance sensor configured to sense an ambient illuminance,
wherein the processor is configured to variably apply the compensation value based on the sensed ambient illuminance.

12. The electronic device of claim 10, wherein the compensation value includes a saturation compensation value that decreases a saturation of each pixel of the output image corresponding to a color of the grill.

13. The electronic device of claim 1, the processor is configured to determine whether to compensate at least one of the output image and the output sound source according to a user input.

14. The electronic device of claim 1, wherein the grill covers at least a portion of the display, and
wherein the processor is configured to compensate the output image in an area of the display covered by the grill.

15. A control method of an electronic device by at least one processor, comprising:
identifying, by the at least one processor, whether a grill is mounted on a first surface of a housing including at least one of a display that outputs an image and a speaker that outputs sound; and
compensating, by the at least one processor, at least one of an output image of the display and an output sound source of the speaker according to whether the grill is mounted.

* * * * *